United States Patent
Magee et al.

(10) Patent No.: US 7,457,369 B2
(45) Date of Patent: Nov. 25, 2008

(54) SCALABLE GAIN TRAINING GENERATOR, METHOD OF GAIN TRAINING AND MIMO COMMUNICATION SYSTEM EMPLOYING THE GENERATOR AND METHOD

(75) Inventors: David P. Magee, Plano, TX (US);
Michael T. DiRenzo, Coppell, TX (US);
Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 599 days.

(21) Appl. No.: 11/028,829

(22) Filed: Jan. 4, 2005

(65) Prior Publication Data

US 2005/0169398 A1  Aug. 4, 2005

Related U.S. Application Data

(60) Provisional application No. 60/542,046, filed on Feb. 5, 2004, provisional application No. 60/540,653, filed on Jan. 29, 2004.

(51) Int. Cl.
*H04B 7/02* (2006.01)
(52) U.S. Cl. .................. 375/267; 375/260; 375/345
(58) Field of Classification Search ............. 375/260, 375/267, 341, 345, 295, 347; 370/208, 310, 370/334; 341/139
See application file for complete search history.

(56) References Cited

U.S. PATENT DOCUMENTS

2004/0058701 A1*  3/2004  Jung et al. ............... 455/522
2004/0136465 A1*  7/2004  Hwang et al. ............ 375/267

OTHER PUBLICATIONS

Jianhua, Liu, "A MIMO system with backward compatibility for OFDM based WLANS",2003 4th IEEE workshop on signal processing, pp. 130-134.*
Erick Larsson, "preamble design for multiple-antenna OFDM-based WLANs with null carriers", Nov. 2001, IEEE signal processing Letters, vol. 8 No. 11, pp. 285-289.*

* cited by examiner

*Primary Examiner*—David C Payne
*Assistant Examiner*—Rahel Guarino
(74) *Attorney, Agent, or Firm*—Steven A. Shaw; W. James Brady; Frederick J. Telecky, Jr.

(57) ABSTRACT

The present invention provides a gain training generator for use with a multiple-input, multiple-output (MIMO) transmitter employing N transmit antennas where N is at least two. In one embodiment, the gain training generator includes a fundamental training encoder configured to provide a basic gain training sequence to one of the N transmit antennas during a time interval to produce a basic gain training waveform having a basic peak-to-average ratio (PAR). Additionally, the gain training generator also includes a supplemental training encoder coupled to the fundamental training encoder and configured to further provide (N−1) supplemental gain training sequences to (N−1) remaining transmit antennas, respectively, during the time interval to produce supplemental gain training waveforms wherein each has a supplemental PAR substantially equal to the basic PAR.

18 Claims, 6 Drawing Sheets

SCALABLE GAIN TRAINING GENERATOR, METHOD OF GAIN TRAINING AND MIMO COMMUNICATION SYSTEM EMPLOYING THE GENERATOR AND METHOD

CROSS-REFERENCE TO RELATED APPLICATIONS

The present application is based on and claims priority of U.S. Provisional Patent Application Ser. No. 60/540,653, filed on Jan. 29, 2004, by David P. Magee et al., entitled "Method for Designing AGC Training Sequences for MIMO Communication Systems," commonly assigned with the present application and incorporated herein by reference. The present application is also related to U.S. Patent Application Ser. No. 60/542,046, filed on Feb. 5, 2004, by David P. Magee et al., entitled "Method for Designing AGC Training Sequences for MIMO Communication Systems," commonly assigned with the present invention and incorporated herein by reference.

TECHNICAL FIELD OF THE INVENTION

The present invention is directed, in general, to communication systems and, more specifically to a gain training generator, a method of gain training and a multiple-input, multiple-output (MIMO) communications system employing the generator or the method.

BACKGROUND OF THE INVENTION

Multiple-input, multiple-output (MIMO) communication systems differ from single-input, single-output (SISO) communication systems in that different data symbols are transmitted simultaneously using multiple antennas. MIMO systems typically employ a cooperating collection of single-dimension transmitters to send a vector symbol of information, which may represent one or more coded or uncoded SISO data symbols. A cooperating collection of single-dimension receivers, constituting a MIMO receiver, then receives one or more copies of this transmitted vector of symbol information. The performance of the entire communication system hinges on the ability of the MIMO receiver to establish reliable estimates of the symbol vector that was transmitted. This includes establishing several parameters, which includes receiver automatic gain control (AGC) for the receive signal.

As a result, training sequences contained in preambles that precede data transmissions are employed to train AGCs to an appropriate level for each receive signal data path. This allows optimal MIMO data decoding to be performed at the MIMO receiver. AGC training and a resulting AGC level typically differ between SISO and MIMO communication systems since the power of the respective receive signals is different. Therefore, a receiver AGC may converge to an inappropriate level for MIMO data decoding if the preamble structure is inappropriate.

For example, a 2×2 MIMO communication system employing orthogonal frequency division multiplexing (OFDM) may transmit two independent and concurrent signals, employing two single-dimension transmitters having separate transmit antennas and two single-dimension receivers having separate receive antennas. Two receive signals $Y_1(k)$, $Y_2(k)$ on the $k^{th}$ sub-carrier or tone following a Fast Fourier Transformation and assuming negligible inter-symbol interference may be written as:

$$Y_1(k)=H_{11}(k)*X_1(k)+H_{12}(k)*X_2(k)+N_1(k) \quad (1a)$$

$$Y_2(k)=H_{21}(k)*X_1(k)+H_{22}(k)*X_2(k)+N_2(k) \quad (1b)$$

where $X_1(k)$ and $X_2(k)$ are two independent signals transmitted on the $k^{th}$ sub-carrier/tone from the first and second transmit antennas, respectively, and $N_1(k)$ and $N_2(k)$ are noises associated with the two receive signals.

The channel coefficients $H_{ij}(k)$, where i=1,2 and j=1,2, incorporates gain and phase distortion associated with symbols transmitted on the $k^{th}$ sub-carrier/tone from transmit antenna j to receive antenna i. The channel coefficients $H_{ij}(k)$ may also include gain and phase distortions due to signal conditioning stages such as filters and other analog electronics. The receiver is required to provide estimates of the channel coefficients $H_{ij}(k)$ to reliably decode the transmitted signals $X_1(k)$ and $X_2(k)$.

At the first receive antenna, the time domain channel representations from the first and second transmit antennas are given by $h_{11}[n]$ and $h_{12}[n]$ respectively. A receiver AGC could be trained by employing a single gain training sequence portion of a preamble resulting in a receive signal power of $\|h_{11}\|_2^2$ at antenna one of the receiver. Then the AGC level may be derived by employing the receiver analog-to-digital converter dynamic range ($ADC_{DR}$), the square root of the channel power $\|h_{11}\|_2$ and a backoff level using the expression $ADC_{DR}/$(backoff level)/$\|h_{11}\|_2$. The backoff level is a measure of the peak-to-mean receive signal power values expected.

For example, a backoff level of 12 dB (4:1 peak-to-mean) allows for two bits in the ADC conversion to accommodate peak values before clipping occurs. This AGC setting would ensure receiving a maximum signal strength for this backoff level in a SISO system. However, for MIMO operation, both transmit antennas typically emit independent data to give receive signal power of $\|h_{11}\|_2^2+\|h_{12}\|_2^2$ at antenna one, for example, which is different than that of the SISO system. This difference can cause clipping of some of the receive signals due to improperly set AGC levels and therefore generate transmission errors. Therefore, a MIMO communication system that provides proper AGC levels for multiple concurrent data transmissions and allows proper AGC levels for SISO or legacy communication systems would be particularly advantageous.

Accordingly, what is needed in the art is an efficient way to provide gain training for MIMO data transmissions that maintains backward compatibility with a legacy communication system.

SUMMARY OF THE INVENTION

To address the above-discussed deficiencies of the prior art, the present invention provides a gain training generator for use with a multiple-input, multiple-output (MIMO) transmitter employing N transmit antennas where N is at least two. In one embodiment, the gain training generator includes a fundamental training encoder configured to provide a basic gain training sequence to one of the N transmit antennas during a time interval to produce a basic gain training waveform having a basic peak-to-average ratio (PAR). Additionally, the gain training generator also includes a supplemental training encoder coupled to the fundamental training encoder and configured to further provide (N−1) supplemental gain training sequences to (N−1) remaining transmit antennas, respectively, during the time interval to produce supplemental gain training waveforms wherein each has a supplemental PAR substantially equal to the basic PAR.

In another aspect, the present invention provides a method of gain training for use with a multiple-input, multiple-output (MIMO) transmitter employing N transmit antennas where N is at least two. The method includes providing a basic gain training sequence to one of the N transmit antennas during a time interval to produce a basic gain training waveform having a basic peak-to-average ratio (PAR). The method also includes further providing (N−1) supplemental gain training sequences to (N−1) remaining transmit antennas, respectively, during the time interval to produce supplemental gain training waveforms wherein each has a supplemental PAR substantially equal to the basic PAR.

The present invention also provides, in yet another aspect, a multiple-input, multiple-output (MIMO) communication system. The MIMO communication system employs a MIMO transmitter that has N transmit antennas, where N is at least two, to provide multiple concurrent data transmissions. The MIMO communication system also includes a gain training generator that is coupled to the MIMO transmitter. The gain training generator has a fundamental training encoder that provides a basic gain training sequence to one of the N transmit antennas during a time interval to produce a basic gain training waveform having a basic peak-to-average ratio (PAR). The gain training generator also has a supplemental training encoder, coupled to the fundamental training encoder, that further provides (N−1) supplemental gain training sequences to (N−1) remaining transmit antennas, respectively, during the time interval to produce supplemental gain training waveforms wherein each has a supplemental PAR substantially equal to the basic PAR. The communication system further includes a MIMO receiver that employs M receive antennas, where M is at least two, and generates the basic and supplemental gain training waveforms to establish receive gains for receiving the multiple concurrent data transmissions.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
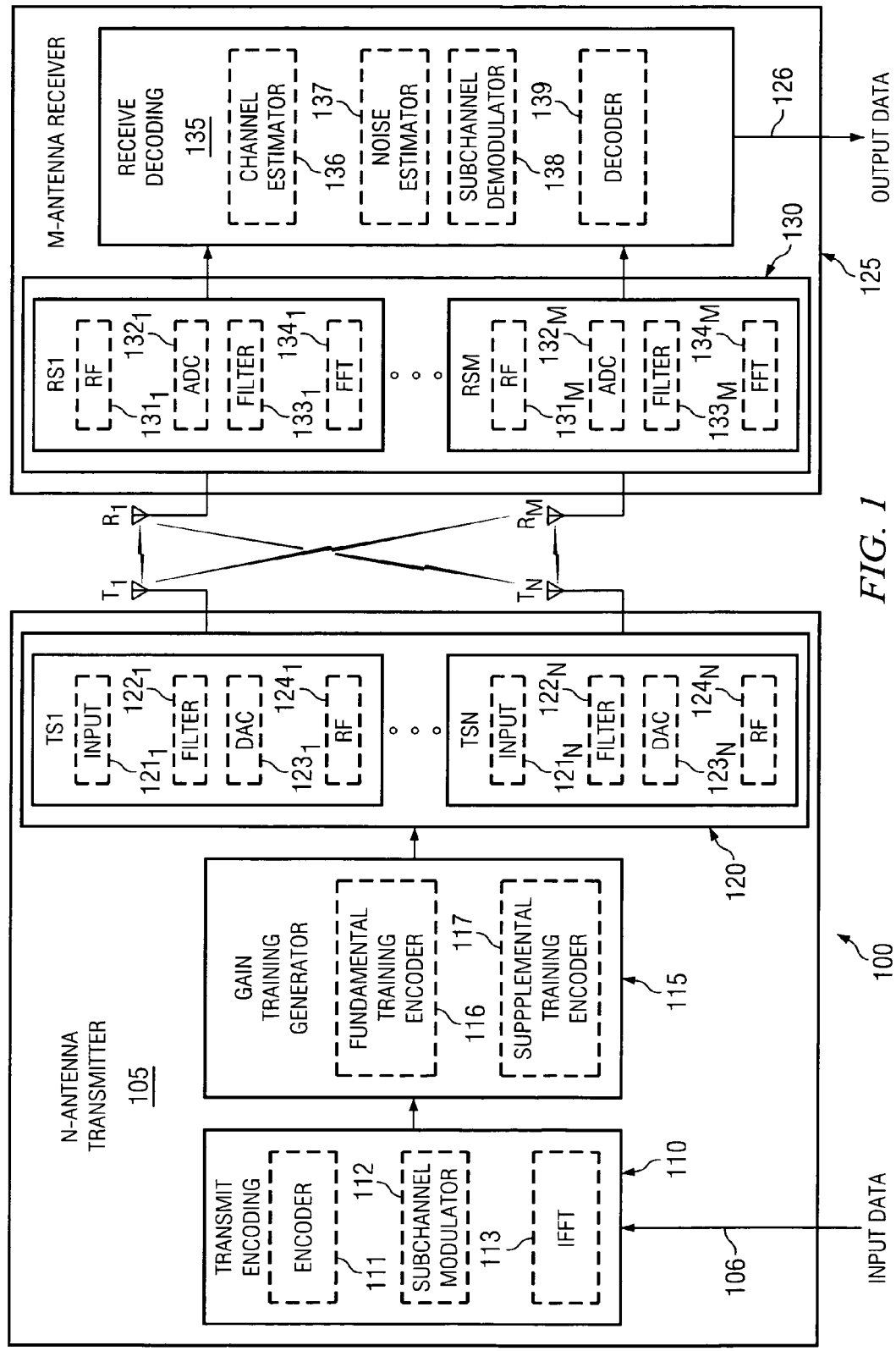
FIG. 1 illustrates a system diagram of an embodiment of an N×M MIMO communication system constructed in accordance with the principles of the present invention.

Referring initially to FIG. 1, illustrated is a system diagram of an embodiment of an N×M MIMO communication system, generally designated 100, constructed in accordance with the principles of the present invention. The MIMO communication system 100 includes a MIMO transmitter 105 and a MIMO receiver 125. The MIMO transmitter 105 employs input data 106 and includes a transmit encoding system 110, a gain training generator 115, and a transmit system 120 having N transmit sections TS1-TSN coupled to N transmit antennas T1-TN, respectively. The receiver 125 includes a receive system 130 having M receive sections RS1-RSM respectively coupled to M receive antennas R1-RM, and a receive decoding system 135 providing output data 126.

In the embodiment of FIG. 1, N and M are at least two. The MIMO transmitter 105 provides multiple concurrent data transmissions, and the gain training generator 115 generates basic and supplemental gain training waveforms to establish receive gains for receiving the multiple concurrent data transmissions. The transmit encoding system 110 includes an encoder 111, a subchannel modulator 112 and an Inverse Fast Fourier Transform (IFFT) section 113. The encoder 111, subchannel modulator 112 and IFFT section 113 prepare the input data and support the arrangement of preamble information and signal information for transmission by the transmit system 120.

The gain training generator 115 includes a fundamendal training encoder 116 and a supplemental training encoder 117, which cooperate with the transmit encoding system 110 to generate a time-slot optimized gain training structure. This allows proper automatic gain control (AGC) training and communication channel estimation for the receiver 125, which is needed to process the transmission. Additionally, the fundamental and supplemental training encoders 116, 117 may be employed in either the frequency or time domain. For the time domain, an IFFT of the appropriate gain training information may be pre-computed and read from memory at the required transmission time.

The N transmit sections TS1-TSN include corresponding pluralities of N input sections $121_1$-$121_N$, N filters $122_1$-$122_N$, N digital-to-analog converters (DACs) $123_1$-$123_N$ and N radio frequency (RF) sections $124_1$-$124_N$, respectively. The N transmit sections TS1-TSN provide time domain signals, which have proportionally scaled preamble fields, signal fields and data fields for proper packet transmission by the N transmit antennas T1-TN, respectively.

The M receive antennas R1-RM receive the transmission and provide it to the M respective receive sections RS1-RSM, which include corresponding M RF sections $131_1$-$131_m$, M analog-to-digital converters (ADCs) $132_1$-$132_m$, M filters $133_1$-$133_M$, and M Fast Fourier Transform (FFT) sections $134_1$-$134_M$, respectively. The M receive sections RS1-RSM employ a proper AGC level to provide frequency domain signals with similar time domain power levels to the receive decoding system 135. Setting of the proper AGC level is accomplished by establishing a proper ratio between a desired power level and a received power level for a selected ADC backoff level. The receive decoding system 135 includes a channel estimator 136, a noise estimator 137, a subchannel demodulator 138 and a decoder 139 that employ preamble and gain training information, signal information and input data to provide the output data 126.

In the gain training generator 115, the fundamental training encoder 116 is configured to provide a basic gain training sequence to one of the transmit antennas T1-TN during a time interval that produces a basic gain training waveform having a basic peak-to-average ratio (PAR). Additionally, the supplemental training encoder 117 is coupled to the fundamental training encoder 116 and configured to further provide (N−1) supplemental gain training sequences to the remaining transmit antennas T2-TN, respectively, during the time interval to produce supplemental gain training waveforms wherein each has a supplemental PAR substantially equal to the basic PAR. The (N−1) supplemental gain training sequences and the basic gain training sequences are either orthogonal or substantially orthogonal, as will be further discussed. The gain training generator 115 provides a time-slot optimized preamble structure wherein appropriate AGC levels in the MIMO receiver 125 may be established without requiring additional gain training time-slots.

The scalable property of the gain training generator 115 allows it to accommodate the MIMO transmitter 105 when employing an N of two or more transmit antennas. This property accommodates the associated MIMO receiver 125 when employing an M of two or more receive antennas, to effectively provide receive AGC levels associated with each of the M receive antennas R1-RM. As the number of transmit antennas increases, a training sequence is provided for each new transmit antenna that does not interfere with the existing AGC training procedure at the receiver. This properly accommodates the associated MIMO receiver 125 when employing an M of two or more receive antennas, to effectively provide receive AGC levels associated with each of the M receive antennas R1-RM.

The signal power of the gain training sequences in the MIMO communication system 100 is representative of the signal power of both the signal and data sequences. Also, the gain training sequences are designed so that they do not interfere with one another at the MIMO receiver 125. This condition allows the AGC for each receive path to be adjusted to an appropriate gain value.

First, second and third design approaches are presented. The first approach is a straight-forward approach that identifies all possible +1/−1 combinations that provide an orthogonal set with PARs within an acceptable range. The second approach is a phasor approach that relaxes the +1/−1 constraint to give an additional set of orthogonal sequences with PARs within an acceptable range. The third approach is a circular shifted approach that relaxes the orthogonality condition to give a substantially orthogonal set of sequences having equal PARs.

For gain training sequences that are orthogonal, the following mathematical relationship must hold:

$$\sum_{k=0}^{K-1} SS_m^*[k] \cdot SS_n[k] = 0, \quad (2)$$

for each of the gain training sequences when $m \neq n$, where $SS_m$ represents the $m^{th}$ gain training sequence, k represents the tone number in the frequency domain, K represents the number of tones and "*" denotes the complex conjugate.

The first approach determines a set of gain training sequences by searching over all possible sequences given a set of possible values and a desired range of PAR. For example, if the values are limited to +1 and −1 and the maximum desired PAR value is set to 3, then the following orthogonal set of gain training sequences (3) may be found that are backward compatible with the short sequence associated with the IEEE 802.11a standard.

$$SS_1[k_{SS}] = \sqrt{\frac{13}{6}} * (1+j) * [+1, -1, \quad (3)$$
$$+1, -1, -1, +1, -1, -1, +1, +1, +1, +1]$$

$$SS_2[k_{SS}] = \sqrt{\frac{13}{6}} * (1+j) * [+1, +1, +1, +1,$$
$$-1, -1, +1, -1, -1, +1, -1, +1]$$

$$SS_3[k_{SS}] = \sqrt{\frac{13}{6}} * (1+j) * [+1, +1, +1, -1,$$
$$-1, -1, -1, +1, -1, -1, +1, -1]$$

$$SS_4[k_{SS}] = \sqrt{\frac{13}{6}} * (1+j) * [+1, -1, +1, +1,$$
$$-1, +1, +1, +1, +1, -1, -1, -1]$$

Note that $k_{SS}$ denotes the indices of the energized tones in the IEEE 802.11a short sequence symbol. The PARs for each of these sequences are 2.48, 2.48, 2.44 and 2.44, respectively, and the matched filter output for each sequence is discussed with respect to FIGS. 2A-2D below.

In the second approach, the orthogonality concept may be extended by defining training sequences using a phasor as shown in the following equation (4):

$$SS_m[k] = e^{-j\frac{2\pi}{K}km} S\hat{S}[k], \quad (4)$$

where $S\hat{S}[k]$ is a known or predefined training sequence and m is an integer. Substituting into equation (2) produces:

$$\sum_{k=0}^{K-1} e^{j\frac{2\pi}{K}km} e^{-j\frac{2\pi}{K}kn} S\hat{S}^*[k] \cdot S\hat{S}[k] = 0. \quad (5)$$

If each value in the training sequence has the same magnitude (i.e., $S\hat{S}^*[k] \cdot S\hat{S}[k]$ has the same nonzero value for all k), then equation (5) can be simplified to form a constraint equation given by the following equation (6):

$$\sum_{k=0}^{K-1} e^{j\frac{2\pi}{K}km} e^{-j\frac{2\pi}{K}kn} = 0. \quad (6)$$

This constraint equation (6) can be used to determine a set of gain training sequences that are orthogonal and can be further simplified if given a set of assumptions for the gain training sequences. For example, the short sequence in the IEEE 802.11 standard does not energize all of the tones, does not energize the DC tone and has negative tone indexing. For the frequencies of interest in this example, $$k \in \left\{-\frac{K}{2}, \ldots -1, 1, \ldots, \frac{K}{2}\right\}$$

where K=12. Also let k→z and K→Z in the orthogonality equation since the equations are only valid over a subset of tones in an OFDM symbol.

The summation in the constraint equation may be written as:

$$\sum_{z=-\frac{Z}{2}}^{-1} e^{j\frac{2\pi}{Z}zm} e^{-j\frac{2\pi}{Z}zn} + \sum_{z=1}^{\frac{Z}{2}} e^{j\frac{2\pi}{Z}zm} e^{-j\frac{2\pi}{Z}zn} = 0. \quad (7)$$

When designing orthogonal short sequences. This equation (7) can be written as:

$$\sum_{z=-\frac{Z}{2}}^{-1} e^{j\frac{2\pi}{Z}z(m-n)} + \sum_{z=1}^{\frac{Z}{2}} e^{j\frac{2\pi}{Z}z-(m-n)} = 0, \quad (8)$$

which can be simplified to $$\sum_{z=1}^{\frac{Z}{2}} \left( e^{j\frac{2\pi}{Z}z(m-n)} + e^{-j\frac{2\pi}{Z}z(m-n)} \right) = 0. \quad (9)$$

Knowing $$\cos(a) = \frac{e^{ja} + e^{-ja}}{2},$$

the previous equation (9) may be written as:

$$\sum_{z=1}^{\frac{Z}{2}} 2\cos\left(\frac{2\pi}{Z}z(m-n)\right) = 0. \quad (10)$$

Knowing $$\sum_{z=1}^{N} 2\cos(zu) = \frac{\sin\left(\frac{(2N+1)u}{2}\right)}{\sin\left(\frac{u}{2}\right)} - 1,$$

equation (10) may be written as:

$$\sin\left(\frac{\pi(Z+1)(m-n)}{Z}\right) - \sin\left(\frac{\pi(m-n)}{Z}\right) = 0. \quad (11)$$

Knowing $$\sin(a) - \sin(b) = 2\sin\left(\frac{a-b}{2}\right)\cos\left(\frac{a+b}{2}\right),$$

the following constraint equation (12) results:

$$\sin\left(\frac{\pi(m-n)}{2}\right)\cos\left(\frac{\pi(Z+2)(m-n)}{2Z}\right) = 0. \quad (12)$$

Since sin (a)=0 when a=πp, −∞<p<∞ and cos (b)=0 when $$b = \frac{\pi}{2}(2q+1), -\infty \le q \le \infty,$$

the equation may be solved to yield $$m = 2p + n, -\infty \le p \le \infty \text{ and}$$

$$m = \frac{Z}{(Z+2)}(2q+1) + n, -\infty \le q \le \infty$$

for the indices that satisfy the original orthogonality constraint.

To generate a set of gain training sequences that are backward compatible with IEEE 802.11a (i.e., one of the gain training sequences is the IEEE 802.11a short sequence), set n=0 and use z∈{−6, . . . ,−1, 1, . . . , 6} and Z=12. As a result, there are six orthogonal sequences corresponding to m∈{0, 2, 4, 6, 8, 10}.

The equations for four orthogonal gain training sequences corresponding to m∈{0, 2, 4, 6} are given by the following gain training sequences (13), below. The PARs for each of these sequences are 2.48, 2.46, 2.46 and 2.48, respectively, and the matched filter output for each sequence is discussed with respect to FIGS. 3A-3D below.

$$SS_1[k_{SS}] = \sqrt{\frac{13}{6}} * (1+j) * [+1, -1, \quad (13)$$

$$+1, -1, -1, +1, -1, -1, +1, +1, +1, +1]$$

$$SS_2[k_{SS}] = \sqrt{\frac{13}{6}} * (1+j) * \left[+1, \frac{-1-j\sqrt{3}}{2},\right.$$

$$\frac{-1+j\sqrt{3}}{2}, +1, \frac{1+j\sqrt{3}}{2}, \frac{1-j\sqrt{3}}{2}, \frac{-1-j\sqrt{3}}{2},$$

$$\left.\frac{1-j\sqrt{3}}{2}, -1, \frac{-1-j\sqrt{3}}{2}, \frac{1-j\sqrt{3}}{2}, +1\right]$$

-continued $$SS_3[k_{SS}] = \sqrt{\frac{13}{6}} *(1+j)* \left[+1, \frac{1-j\sqrt{3}}{2},\right.$$

$$\frac{-1-j\sqrt{3}}{2}, -1, \frac{1-j\sqrt{3}}{2}, \frac{-1-j\sqrt{3}}{2}, \frac{1-j\sqrt{3}}{2},$$

$$\left.\frac{1+j\sqrt{3}}{2}, +1, \frac{-1+j\sqrt{3}}{2}, \frac{-1-j\sqrt{3}}{2}, +1\right]$$

$$SS_4[k_{SS}] = \sqrt{\frac{13}{6}} *(1+j)*[+1, +1, +1, +1,$$

$$-1, -1, +1, -1, -1, +1, -1, +1]$$

The constraint equations from equation (10) may also be used to generate a set of channel estimation training sequences that are backward compatible with IEEE 802.11a (i.e., one of the training sequences is the IEEE 802.11a long sequence) by setting n=0 and using z∈{−26, . . . , −1, . . . , 1 . . . , 26} and Z=52. As a result, there are 26 orthogonal sequences corresponding to m∈{0, 2, . . . , 48, 50}.

A drawback to the orthogonal sequences presented in the phasor approach above is that their PAR values are not exactly equal. However, since circular shifted sequences in time have the same PAR, this property may be used to generate a set of substantially orthogonal sequences. That is, from the properties associated with the Discrete Fourier Transform (DFT), it is known that:

$$x[(n-m)_K] \leftrightarrow W_K^{km} X[k], \quad (14)$$

where $$W_K = e^{-j\frac{2\pi}{K}},$$

and K is the number of tones in the OFDM symbol. Since the phasor multiples all of the tones in the symbol and since not all of the tones in the IEEE 802.11a short sequence are energized, the mathematically rigorous definition of orthogonality cannot be maintained. However, a substantially orthogonal condition can be maintained (i.e., the summation is below some acceptable threshold), which is given by the following equation (15):

$$\sum_{k=0}^{K-1} e^{j\frac{2\pi}{K}km} e^{-j\frac{2\pi}{K}kn} < \varepsilon, \quad (15)$$

where ε is an acceptably small number.

To generate a set of gain training sequences that are backward compatible with the IEEE 802.11a standard (i.e., one of the gain training sequences is the IEEE 802.11a short sequence), set n=0, use z∈{−8, . . . , 1, 1, . . . , 8} and Z=16. As a result, there are eight orthogonal sequences corresponding to m∈{0, 2, 4, 6, 8, 10, 12, 14}.

The equations for four substantially orthogonal gain training sequences corresponding to m∈{0, 2, 4, 6} are given by the following gain training sequences (16):

$$SS_1[k_{SS}] = \sqrt{\frac{13}{6}} *(1+j)*[+1, -1, \quad (16)$$

$$+1, -1, -1, +1, -1, -1, +1, +1, +1, +1]$$

$$SS_2[k_{SS}] = \sqrt{\frac{13}{6}} *(1+j)*[-1, +j, +1, -j,$$

$$+1, -j, -j, +1, -j, +1, +j, -1]$$

$$SS_3[k_{SS}] = \sqrt{\frac{13}{6}} *(1+j)*[+1, +1, +1, +1,$$

$$-1, -1, +1, -1, -1, +1, -1, +1]$$

$$SS_4[k_{SS}] = \sqrt{\frac{13}{6}} *(1+j)*[-1, -j, +1, +j,$$

$$+1, +j, +j, +1, +j, +1, -j, -1]$$

The PAR for each of these sequences is 2.48, and the matched filter output for each sequence is discussed with respect to FIGS. 4A-4B below.

The substantially orthogonal condition may also be used to generate a set of channel estimation training sequences that are backward compatible with the IEEE 802.11a standard (i.e., one of the training sequences is the IEEE 802.11a long sequence) by setting n=0 and using z E {−32, . . . , −1, . . . , 1 . . . , 32} and Z=64. As a result, there are 32 orthogonal sequences.

Figure 2A:
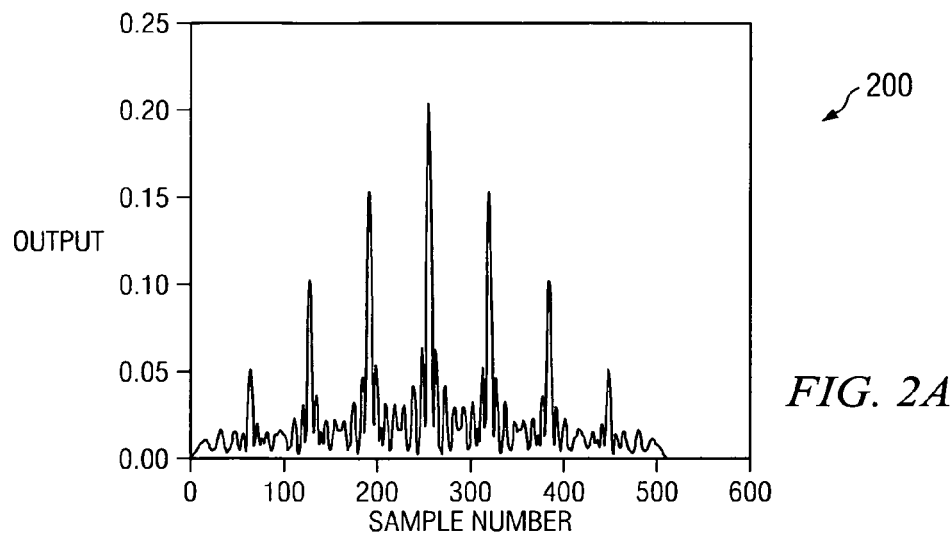
FIGS. 2A, 2B, 2C and 2D, illustrate gain training waveforms corresponding to exemplary training sequences that are constructed in accordance with the principles of the present invention.
Figure 2B:
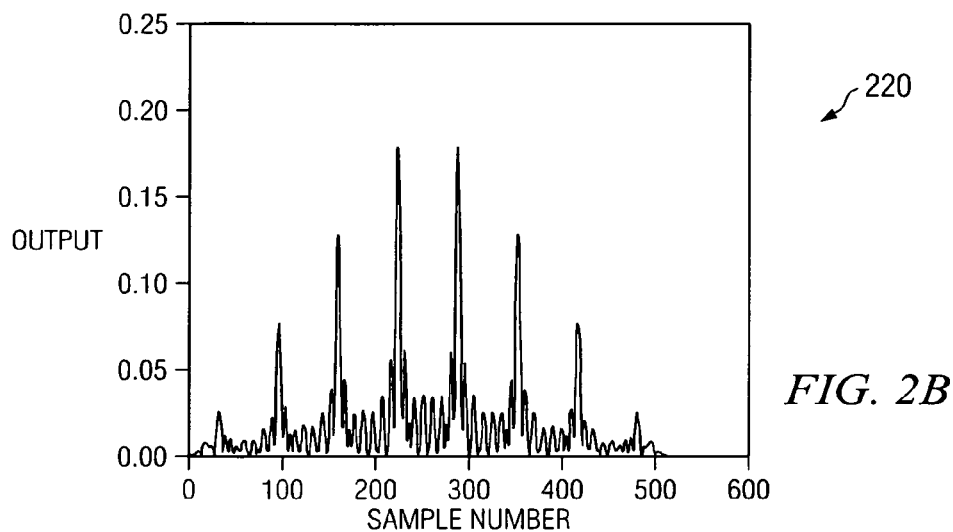
Figure 2C:
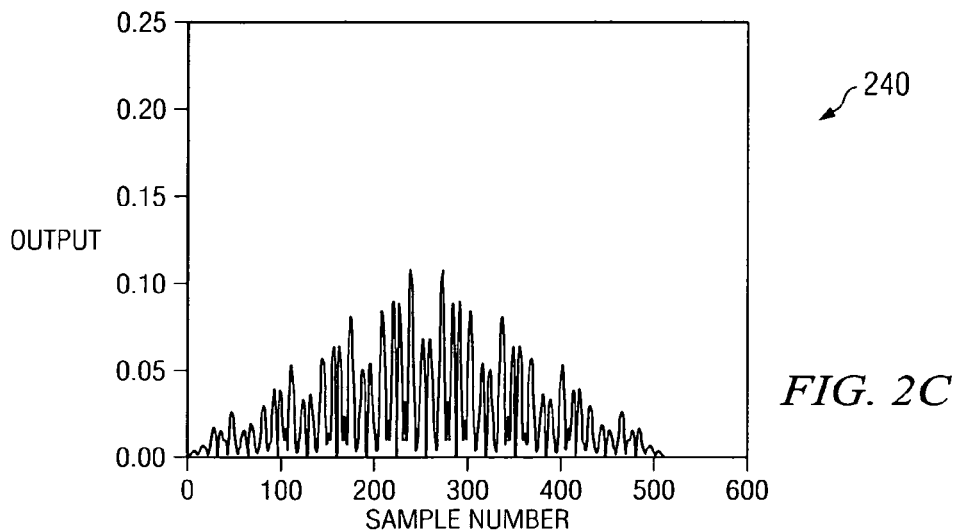
Figure 2D:
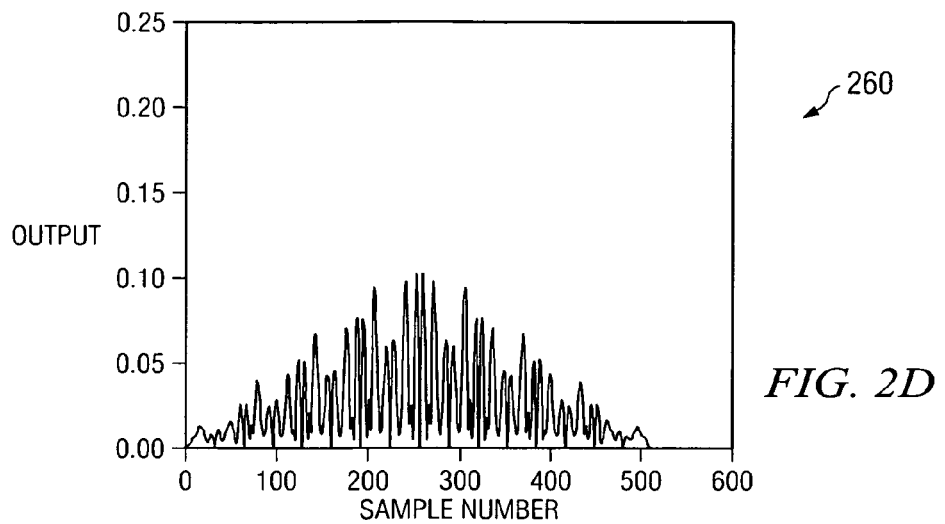

Turning now to FIGS. 2A, 2B, 2C and 2D, illustrated are gain training waveforms corresponding to exemplary training sequences discussed with respect to FIG. 1, generally designated 200, 220, 240 and 260, that are constructed in accordance with the principles of the present invention. FIG. 2A illustrates a receiver matched filter output showing a basic gain training waveform 200 corresponding to the basic gain training sequence SS1 of the gain training sequences (3) discussed above. FIGS. 2B, 2C and 2D illustrate receiver matched filter outputs showing supplemental gain training waveforms 220, 240, 260 corresponding to first, second and third supplemental gain training sequences SS2, SS3 and SS4, respectively, that correspond to the gain training sequences (3), above.

The basic gain training waveform 200 is the receiver matched filter output for a IEEE 802.11a short sequence, which has a PAR of about 2.48. Correspondingly, the supplemental gain training waveforms 220, 240, 260 have a PAR of about 2.48, 2.44 and 2.44, respectively. Additionally, since the basic and supplemental gain training waveforms 200, 220, 240, 260 produce PARs of no more than about three, potential waveform clipping in the receiver is essentially eliminated.

The peak values of the supplemental gain training waveforms 220, 240, 260 are below secondary peak values of the basic gain training waveform 200. Therefore, a false correlation by the receiver is unlikely. Search algorithms looking for peaks over a given window also will not generally be affected. Furthermore, the peak values of the supplemental gain training waveforms 220, 240, 260 are smaller than corresponding peak values for the basic gain training waveform 200, making false peak detection unlikely.

Figure 3A:
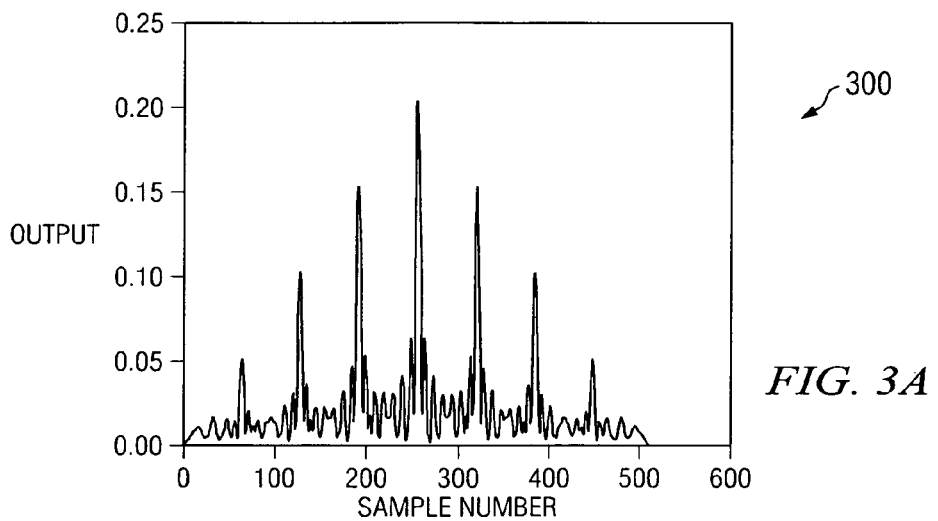
FIGS. 3A, 3B, 3C and 3D, illustrate gain training waveforms corresponding to first alternative exemplary training sequences that are constructed in accordance with the principles of the present invention.
Figure 3B:
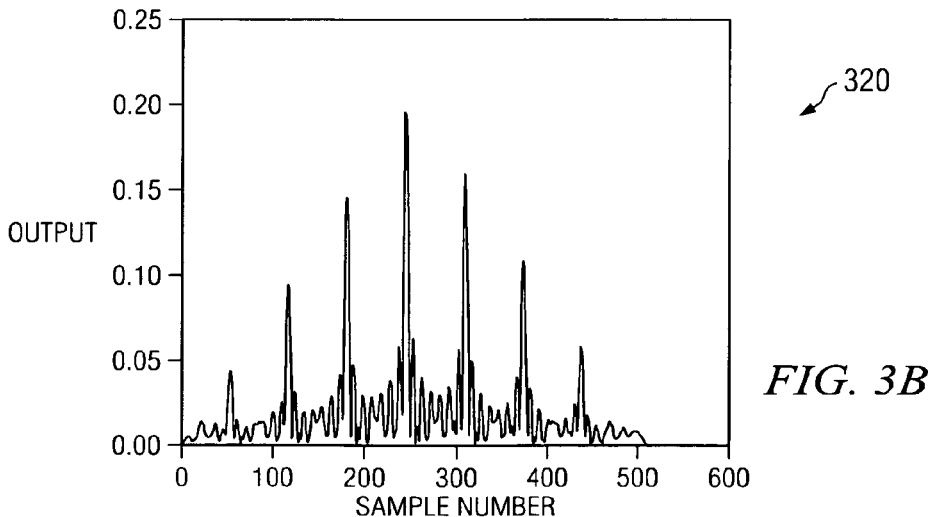
Figure 3C:
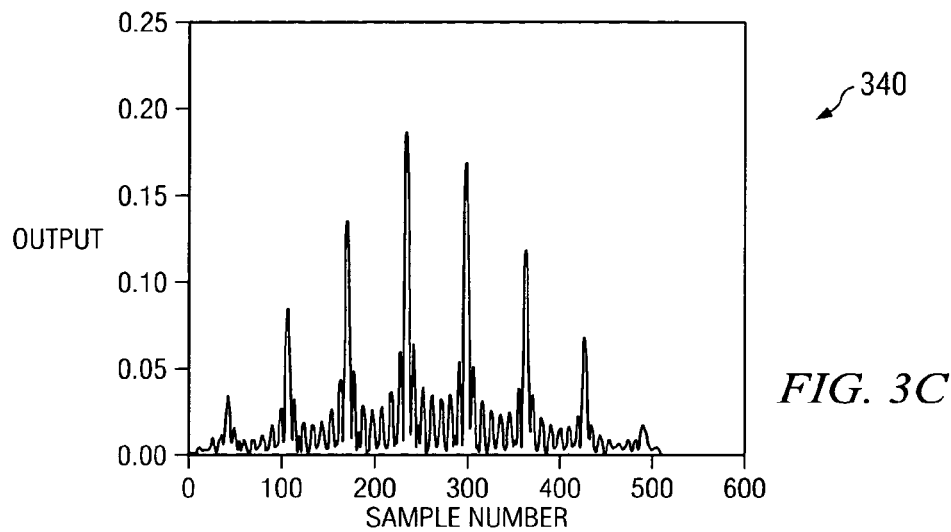
Figure 3D:
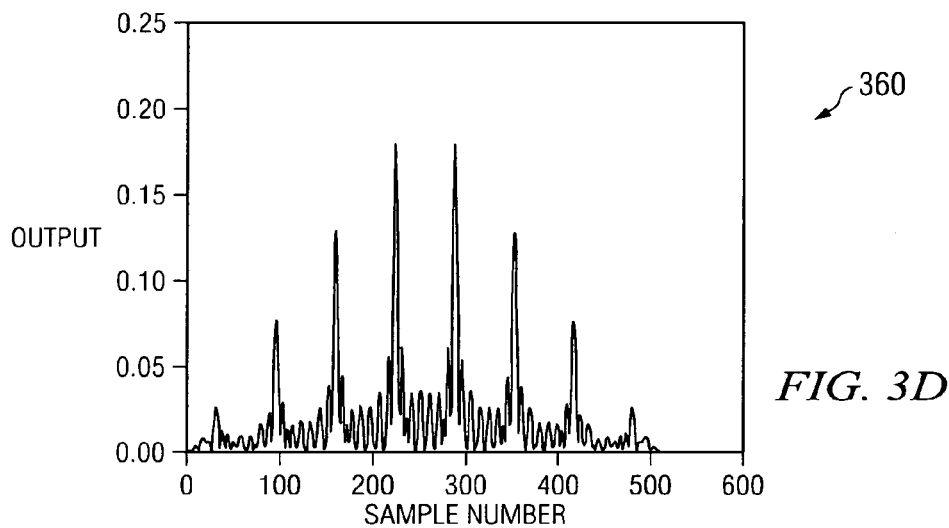

Turning now to FIGS. 3A, 3B, 3C and 3D, illustrated are gain training waveforms corresponding to first alternative exemplary training sequences discussed with respect to FIG. 1, generally designated 300, 320, 340 and 360, that are constructed in accordance with the principles of the present invention. FIG. 3A illustrates a receiver matched filter output showing a basic gain training waveform 300 corresponding to the basic gain training sequence SS1 of the gain training sequences (13) discussed above. FIGS. 3B, 3C and 3D illustrate receiver matched filter outputs showing supplemental gain training waveforms 320, 340, 360 corresponding to first, second and third supplemental gain training sequences SS2, SS3 and SS4, respectively, that are associated with the gain training sequences (13), above.

The basic gain training waveform 300 is the receiver matched filter output for a IEEE 802.11a short sequence, which has a PAR of about 2.48. Correspondingly, the supplemental gain training waveforms 320, 340, 360 have a PAR of about 2.46, 2.46 and 2.48, respectively, which correspond favorably with the waveforms discussed with respect to FIGS. 2A-2D above.

Figure 4A:
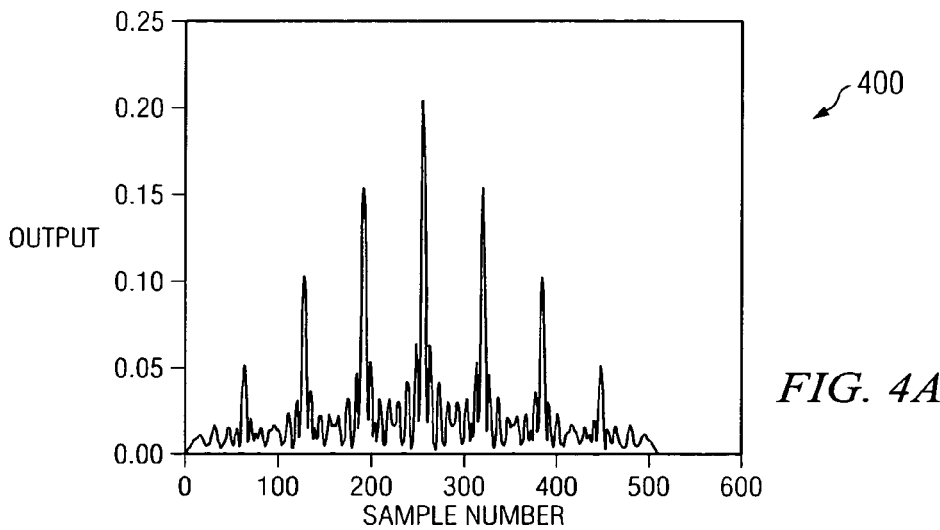
FIGS. 4A, 4B, 4C and 4D illustrate gain training waveforms corresponding to second alternative exemplary training sequences that are constructed in accordance with the principles of the present invention.
Figure 4B:
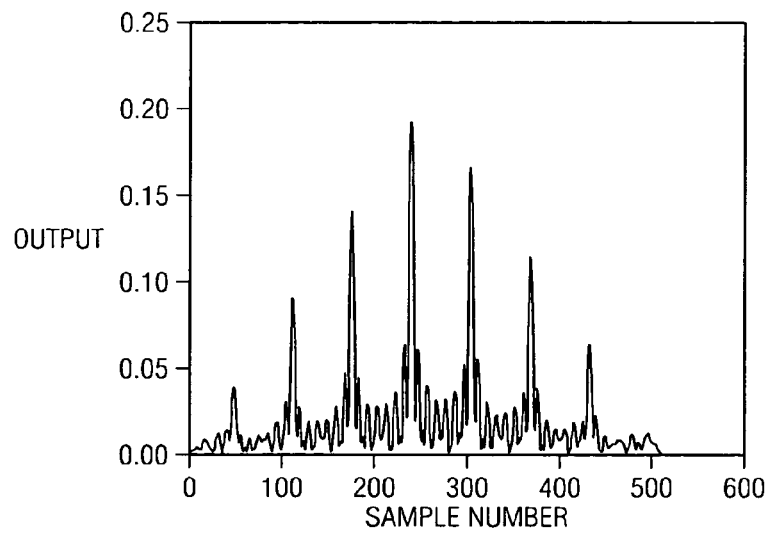
Figure 4C:
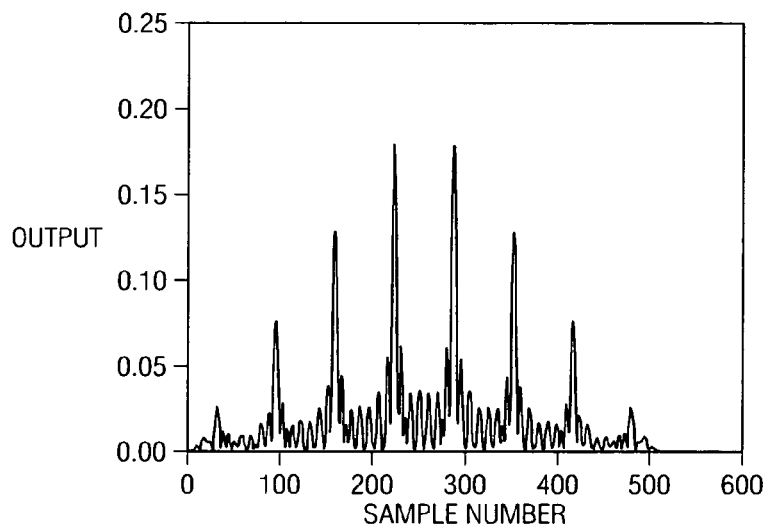
Figure 4D:
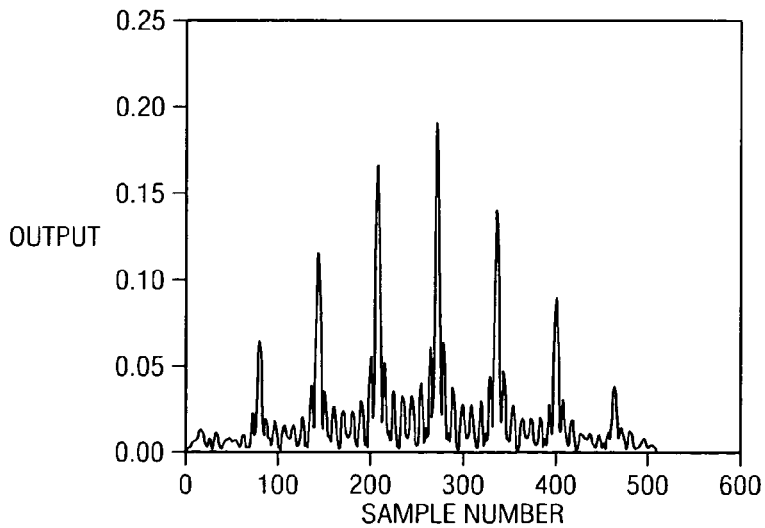

Turning now to FIGS. 4A, 4B, 4C and 4D, illustrated are gain training waveforms corresponding to second alternative exemplary training sequences discussed with respect to FIG. 1, generally designated 400, 420, 440 and 460, that are constructed in accordance with the principles of the present invention. FIG. 4A illustrates a receiver matched filter output showing a basic gain training waveform 400 corresponding to the basic gain training sequence SS1 of the gain training sequences (16) discussed above. FIGS. 4B, 4C and 4D illustrate receiver matched filter outputs showing supplemental gain training waveforms 420, 440, 460 corresponding to first, second and third supplemental gain training sequences SS2, SS3 and SS4, respectively, that are associated with the gain training sequences (16), above.

The basic gain training waveform 400 is the receiver matched filter output for a IEEE 802.11a short sequence, which has a PAR of about 2.48. Correspondingly, each of the supplemental gain training waveforms 420, 440, 460 also have a PAR of about 2.48, which also correspond favorably with the waveforms discussed with respect to FIGS. 2A-2D above.

Figure 5:
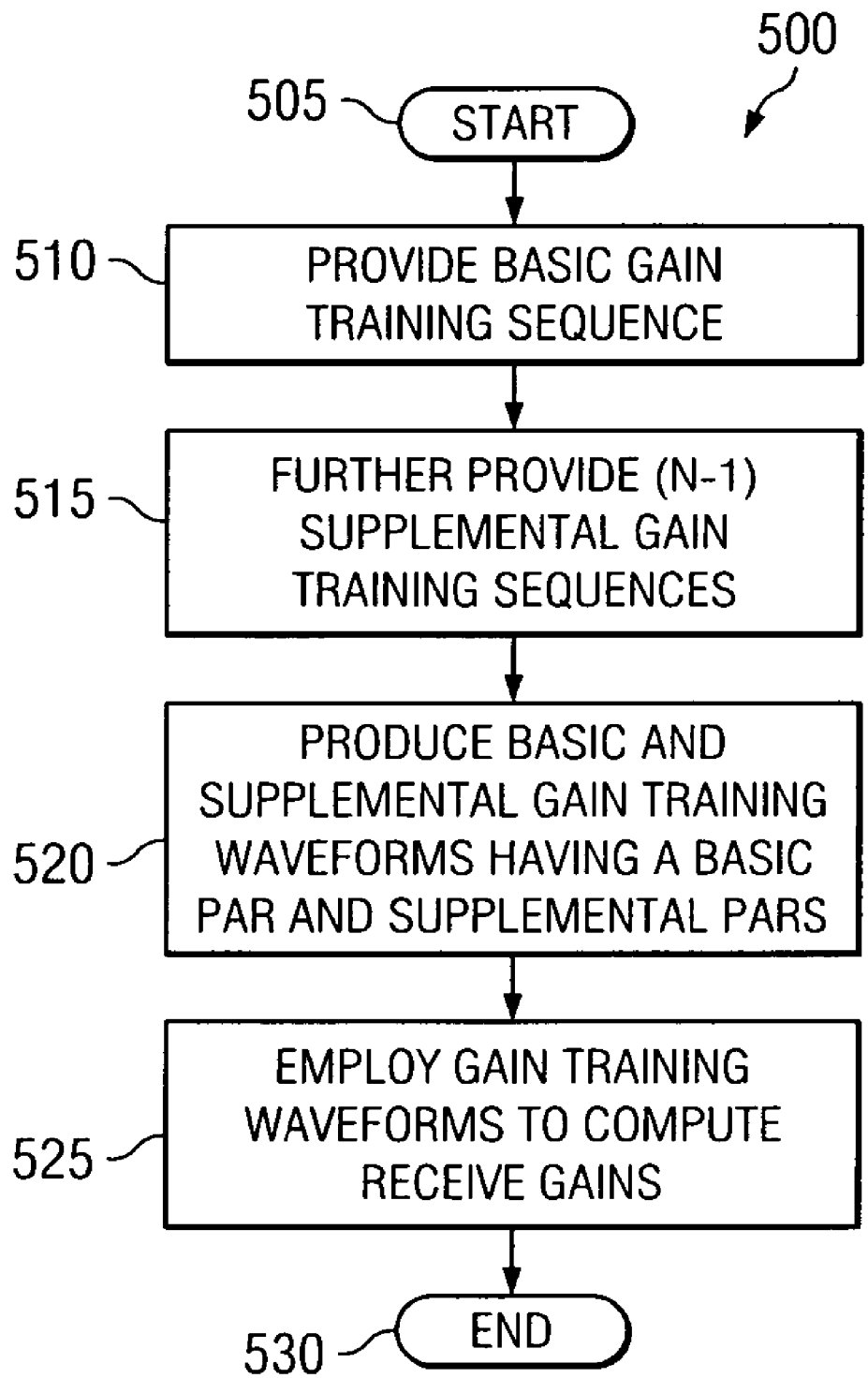
FIG. 5 illustrates a flow diagram of an embodiment of a method of gain training carried out in accordance with the principles of the present invention.

Turning now to FIG. 5, illustrated is a flow diagram of an embodiment of a method of gain training, generally designated 500, carried out in accordance with the principles of the present invention. The method 500 may be used with a MIMO transmitter that employs an N of at least two transmit antennas and starts in a step 505. Then, in a step 510, a basic gain training sequence is provided to one of the N transmit antennas during a time interval, and (N−1) supplemental gain training sequences are provided to the (N−1) remaining transmit antennas during the time interval in a step 515. The basic gain training sequence may be employed with a legacy system such as one that conforms to the IEEE 802.11a standard.

In a step 520, The basic gain training sequence produces a receive basic gain training waveform having a basic PAR, and the (N−1) supplemental gain training sequences produce corresponding receive supplemental gain training waveforms wherein each has a supplemental PAR that is substantially equal to the basic PAR. Each of the (N−1) supplemental gain training sequences are either orthogonal or substantially orthogonal and include the basic gain training sequence.

Additionally, the supplemental gain training waveforms may be provided in at least one of several ways that include a straight-forward approach, a phasor approach or a circular shifted approach. These approaches provide supplemental PARs that are either substantially equal or actually equal. Additionally they do not negatively impact legacy systems because their matched filter response is either less than 50 percent of the corresponding peaks for the basic gain training sequence, or their matched filter response peaks have the same fundamental frequency as the matched filter response for the basic gain training sequence. The basic and supplemental gain training waveforms are employed to compute receive gains in a step 525 and the method ends in a step 530.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

In summary, embodiments of the present invention employing a gain training generator, a method of gain training and a MIMO communication system employing the generator or method have been presented. Advantages include the ability to efficiently determine receive gains that are appropriate for receiving multiple concurrent data transmissions while preserving backward compatibility with legacy systems such as those that conform to the IEEE 802.11a standard.

Those skilled in the pertinent art will understand that the present invention can be applied to conventional or future-discovered MIMO communication systems. For example, these systems may form a part of a narrowband wireless communication system employing multiple antennas, a broadband communication system employing time division multiple access (TDMA), orthogonal frequency division multiplex (OFDM) or a general multiuser communication system.

Although the present invention has been described in detail, those skilled in the art should understand that they can make various changes, substitutions and alterations herein without departing from the spirit and scope of the invention in its broadest form.

What is claimed is:

1. A gain training generator for use with a multiple-input, multiple-output (MIMO) transmitter employing N transmit antennas, N being at least two, comprising:
a fundamental training encoder configured to provide a basic gain training sequence to one of said N transmit antennas during a time interval to produce a basic gain training waveform having a basic peak-to-average ratio (PAR); and
a supplemental training encoder coupled to said fundamental training encoder and configured to further provide (N−1) supplemental gain training sequences to (N−1) remaining transmit antennas, respectively, during said time interval to produce supplemental gain training waveforms wherein each has a supplemental PAR substantially equal to said basic PAR, wherein said (N−1) supplemental gain training sequences are circular shifted sequences.

2. The generator as recited in claim 1 wherein said (N−1) supplemental gain training sequences and said basic gain training sequence are orthogonal.

3. The generator as recited in claim 1 wherein said (N−1) supplemental gain training sequences are substantially orthogonal to said basic gain training sequence.

4. The generator as recited in claim 3 wherein said (N−1) supplemental gain training sequences produce supplemental PARs that are equal.

5. A gain training generator for use with a multiple-input, multiple-output (MIMO) transmitter employing N transmit antennas, N being at least two, comprising:
a fundamental training encoder configured to provide a basic gain training sequence to one of said N transmit antennas during a time interval to produce a basic gain training waveform having a basic peak-to-average ratio (PAR); and a supplemental training encoder coupled to said fundamental training encoder and configured to further provide (N−1) supplemental gain training sequences to (N−1) remaining transmit antennas, respectively, during said time interval to produce supplemental gain training waveforms wherein each has a supplemental PAR substantially equal to said basic PAR, wherein each of said supplemental gain training waveforms contains a peak that is no greater than about 50 percent of a corresponding peak of said basic gain training waveform.

6. The generator as recited in claim 1 wherein each of said (N−1) supplemental gain training sequences produces a supplemental PAR of no more than about three.

7. A method of gain training for use with a multiple-input, multiple-output (MIMO) transmitter employing N transmit antennas, N being at least two, comprising:

providing a basic gain training sequence to one of said N transmit antennas during a time interval to produce a basic gain training waveform having a basic peak-to-average ratio (PAR); and further providing (N−1) supplemental gain training sequences to (N−1) remaining transmit antennas, respectively, during said time interval to produce supplemental gain training waveforms wherein each has a supplemental PAR substantially equal to said basic PAR, wherein said (N−1) supplemental gain training sequences are circular shifted sequences.

8. The method as recited in claim 7 wherein said (N−1) supplemental gain training sequences and said basic gain training sequence are orthogonal.

9. The method as recited in claim 7 wherein said (N−1) supplemental gain training sequences are substantially orthogonal to said basic gain training sequence.

10. The method as recited in claim 9 wherein said (N−1) supplemental gain training sequences produce supplemental PARs that are equal.

11. A method of gain training for use with a multiple-input, multiple-output (MIMO) transmitter employing N transmit antennas, N being at least two, comprising:

providing a basic gain training sequence to one of said N transmit antennas during a time interval to produce a basic gain training waveform having a basic peak-to-average ratio (PAR); and further providing (N−1) supplemental gain training sequences to (N−1) remaining transmit antennas, respectively, during said time interval to produce supplemental gain training waveforms wherein each has a supplemental PAR substantially equal to said basic PAR, wherein each of said supplemental gain training waveforms contains a peak that is no greater than about 50 percent of a corresponding peak of said basic gain training waveform.

12. The method as recited in claim 7 wherein each of said (N−1) supplemental gain training sequences produces a supplemental PAR of no more than about three.

13. A multiple-input, multiple-output (MIMO) communication system, comprising:

a MIMO transmitter that has N transmit antennas, N being at least two, to provide multiple concurrent data transmissions;

a gain training generator that is coupled to said MIMO transmitter, including:

a fundamental training encoder that provides a basic training sequence to one of said N transmit antennas during a time interval to produce a basic gain training waveform having a basic peak-to-average ratio (PAR), and a supplemental training encoder, coupled to said fundamental training encoder, that further provides (N−1) supplemental gain training sequences to (N−1) remaining transmit antennas, respectively, during said time interval to produce supplemental gain training waveforms wherein each has a supplemental PAR substantially equal to said basic PAR and wherein said (N−1) supplemental gain training sequences are circular shifted sequences; and a MIMO receiver that employs M receive antennas, M being at least two, and generates said basic and supplemental gain training waveforms to establish receive gains for receiving said multiple concurrent data transmissions.

14. The communication system as recited in claim 13 wherein said (N−1) supplemental gain training sequences and said basic gain training sequence are orthogonal.

15. The communication system as recited in claim 13 wherein said (N−1) supplemental gain training sequences are substantially orthogonal to said basic gain training sequence.

16. The communication system as recited in claim 15 wherein said (N−1) supplemental gain training sequences produce supplemental PARs that are equal.

17. A multiple-input, multiple-output (MIMO) communication system, comprising:

a MIMO transmitter that has N transmit antennas, N being at least two, to provide multiple concurrent data transmissions;

a gain training generator that is coupled to said MIMO transmitter, including:

a fundamental training encoder that provides a basic training sequence to one of said N transmit antennas during a time interval to produce a basic gain training waveform having a basic peak-to-average ratio (PAR), and a supplemental training encoder, coupled to said fundamental training encoder, that further provides (N−1) supplemental gain training sequences to (N−1) remaining transmit antennas, respectively, during said time interval to produce supplemental gain training waveforms wherein each has a supplemental PAR substantially equal to said basic PAR, wherein each of said supplemental gain training waveforms contains a peak that is no greater than about 50 percent of a corresponding peak of said basic gain training waveform; and a MIMO receiver that employs M receive antennas, M being at least two, and generates said basic and supplemental gain training waveforms to establish receive gains for receiving said multiple concurrent data transmissions.

18. The communication system as recited in claim 13 wherein each of said (N−1) supplemental gain training sequences produces a supplemental PAR of no more than about three.

* * * * *